(12) United States Patent
Kozisek

(10) Patent No.: US 7,825,626 B2
(45) Date of Patent: Nov. 2, 2010

(54) INTEGRATED CHARGER AND HOLDER FOR ONE OR MORE WIRELESS DEVICES

(75) Inventor: Steven E. Kozisek, Leawood, KS (US)

(73) Assignee: Embarq Holdings Company LLC, Overland Park, KS (US)

( * ) Notice: Subject to any disclaimer, the term of this patent is extended or adjusted under 35 U.S.C. 154(b) by 517 days.

(21) Appl. No.: 11/978,266

(22) Filed: Oct. 29, 2007

(65) Prior Publication Data

US 2009/0108801 A1    Apr. 30, 2009

(51) Int. Cl.
*H01M 10/44* (2006.01)
*H01M 10/46* (2006.01)

(52) U.S. Cl. ..................................................... 320/114
(58) Field of Classification Search ................. 320/107, 320/112, 114, 115
See application file for complete search history.

(56) References Cited

U.S. PATENT DOCUMENTS 6,978,163 B2 * 12/2005 Dyer et al. ............... 455/575.2
2005/0212479 A1 * 9/2005 Tsunoda ....................... 320/114
2007/0236180 A1 * 10/2007 Rodgers ....................... 320/115
2008/0119241 A1 * 5/2008 Dorogusker et al. ......... 455/573

\* cited by examiner

*Primary Examiner*—Edward Tso
(74) *Attorney, Agent, or Firm*—Sonnenschein Nath & Rosenthal LLP

(57) ABSTRACT

A device integrated charger and holder for wireless headsets are provided in the illustrative embodiments. An electronic device integrated holder and charger includes a first holder built into the electronic device to hold an object. A second holder is built into a wireless headset to couple to the first holder. A first set of contacts is accessible from the first holder and is configured to provide electrical power. A second set of contacts is accessible from the second holder and configured to receive electrical power from the first set of contacts when the second holder is coupled to the first holder. A method for holding and charging a device includes fastening a wireless headset to an electronic device, providing electrical power from the device to the wireless headset, and charging a power source in the wireless headset using the electrical power.

15 Claims, 3 Drawing Sheets

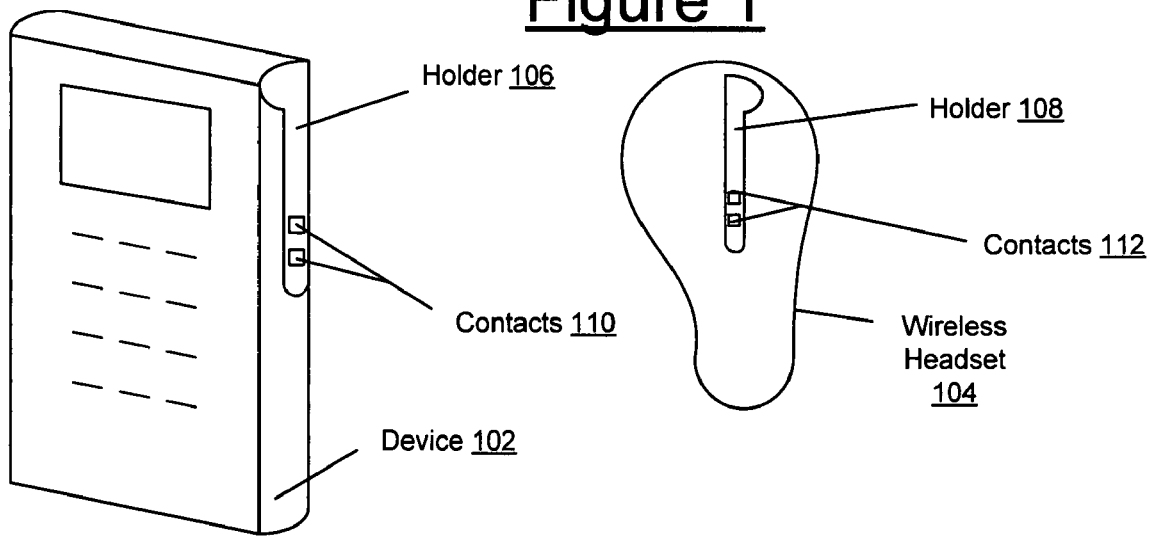
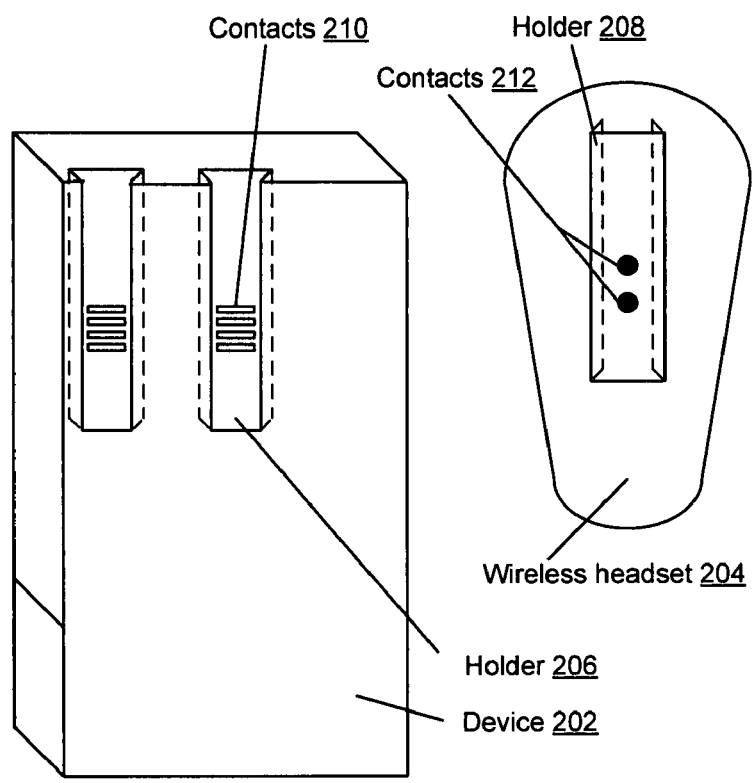

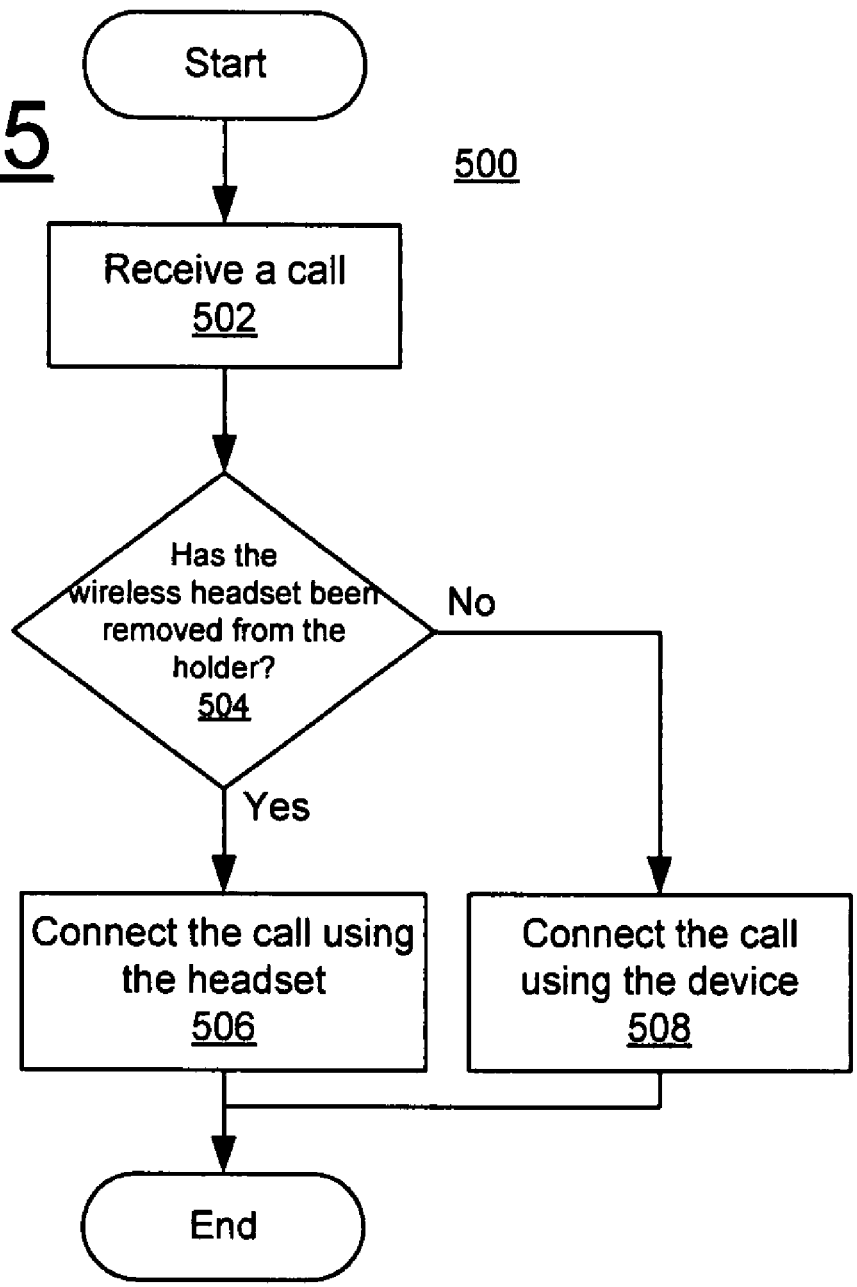

INTEGRATED CHARGER AND HOLDER FOR ONE OR MORE WIRELESS DEVICES

BACKGROUND

1. Field of the Invention

The principles of the present invention relate generally to an electrical charging system, and in particular, to a method of charging a wireless device. Still more particularly, the principles of the present invention relate to a method, apparatus, and computer usable program product for holding a wireless headset in and charging the wireless headset from a corresponding device.

2. Description of the Related Art

Presently, users commonly use wireless headsets for sending and receiving audio and video to and from a corresponding device. A wireless headset is a device typically used for audio and/or video communication with another device using a wireless communication technology. For example, users use wireless headsets having a speaker and a microphone in order to carry on telecommunication using their mobile phones. As another example of a wireless headset, wireless headphones allow a user to enjoy the music or video from a portable player without having to connect the headset to the portable player using wires. Mobile phones, portable music players, and any other device that is capable of wirelessly communicating with a wireless headset may be a device corresponding to the wireless headset.

Wireless headsets may communicate with their corresponding device using a variety of wireless communication technologies. For example, a wireless headset may communicate with a mobile phone using Bluetooth technology, which is a wireless technology enabling short range radio communications, usually within 100 feet. A wireless headset may use any wireless communication technology, including proprietary technologies for wireless audio and video communication.

Furthermore, the wireless audio and video communication may include transmitting and receiving data in a wireless way between the wireless headset and the corresponding device. For example, Bluetooth technology uses a system of data packets for wirelessly transmitting and receiving audio and video content between the wireless headset and the corresponding device.

Wireless headsets generally include a power source to power the various components of the wireless headset. For example, a rechargeable battery included within a wireless headset may power the wireless headset's speaker, microphone, radio transmitter and radio receiver, and electronic functions associated with buttons or keys on the wireless headset. A rechargeable power source included with the wireless headset has to be recharged from time to time so that the power source may be able to supply electrical power to the various components in the wireless headset.

Wireless headsets that include a rechargeable power source presently can be purchased with compatible charging devices. Such a charging device generally has a connector that fits into a compatible electrical receptacle in the wireless headset on one end. The connector is usually installed at the end of an electrical cable that links the connector to a charging unit. The charging unit includes a second connector, either directly thereon, or linked thereto with a second electrical cable. The second connector may be designed to fit into an electrical power source, such as a wall socket providing 110V alternating current (AC) electrical power. The second connector may also be designed to fit into a cigarette lighter socket in an automobile providing 12V direct current (DC) electrical power.

SUMMARY

In order to provide a place to secure and charge a wireless headset, without needing an electrical cable and a separate charger for doing so, the illustrative embodiments provide a device integrated charger and holder for wireless headsets. An electronic device integrated holder and charger may include a first holder built into the electronic device to hold an object. A second holder may be built into a wireless headset to couple to the first holder such that the wireless headset is held in proximity of the electronic device. A first set of contacts is accessible from the first holder and may be configured to provide electrical power. A second set of contacts is accessible from the second holder and configured to receive electrical power from the first set of contacts when the second holder may be coupled to the first holder.

A method for holding and charging a device may include fastening a wireless headset to an electronic device, providing electrical power from the device to the wireless headset, and charging a power source in the wireless headset using the electrical power.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

FIG. 1 depicts a wireless headset and a corresponding device in accordance with an illustrative embodiment;

FIG. 2 depicts a wireless headset and a corresponding device in a second configuration in accordance with an illustrative embodiment;

FIG. 5 depicts a flowchart of a process of connecting a telecommunication call in accordance with an illustrative embodiment.

DETAILED DESCRIPTION OF THE DRAWINGS

Figure 3:
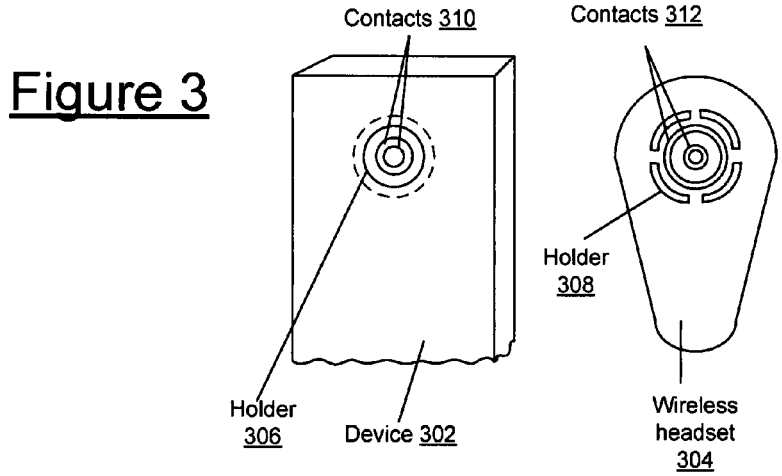
FIG. 3 depicts a wireless headset and a corresponding device in a third configuration in accordance with an illustrative embodiment.

Users of wireless headsets, whether for wireless communication or wireless entertainment, find that the wireless headsets require frequent attention for recharging. Illustrative embodiments recognize that on many occasions, a user may forget to recharge the wireless headset and realize upon a need to use the wireless headset that the wireless headset does not have sufficient power to function.

The size of many wireless headsets is often small in comparison to their corresponding device. The illustrative embodiments further recognize that the small wireless headsets are frequently misplaced and not easily found when a user has to use the wireless headset.

Therefore, a headset holder and charger that holds the wireless headset in proximity of the corresponding device and also charges the wireless headset while in such proximity will be advantageous in removing or reducing the above recognized problems. The illustrative embodiments provide such a holder and charger for a wireless headset that is integrated with the device with which the wireless headset corresponds.

With reference to FIG. 1, this figure depicts a wireless headset and a corresponding device in accordance with an illustrative embodiment. Device 102 is a device that is capable of wirelessly communicating with wireless headset 104. Device 102 includes holder 106 that may be used for holding wireless headset 104 in proximity to device 102. Wireless headset 104 includes holder 108. Holder 106 and holder 108 are complementary to each other. For example, holder 106 may be a cavity of a certain shape and holder 108 may be a projection of a shape designed to securely fit inside holder 106. As another example, holder 106 may be a projection of a certain shape, and holder 108 may be a cavity of a shape designed to receive and securely hold the projection of holder 106. As another example, holders 106 and 108 may be magnetized surfaces of opposite polarity such that when holders 106 and 108 are brought in proximity of one another, they attract, stick and securely hold one another.

Device 102 further includes contacts 110 that are capable of completing an electrical circuit. Contacts 110 may provide electrical power, or send or receive electrical signals to another electrical device, electronic device, appliance, or instrument in electrical contact with contacts 110. Wireless headset 104 may include contacts 112 that correspond with contacts 110 such that contacts 110 and 112 are in electrical contact with each other when device 102 and wireless headset 104 are fastened to each other using holders 106 and 108.

Holders 106 and 108 may be of any size, shape, and characteristic, and may be located anywhere in device 102 and wireless headset 104. Above examples only describe some possible configurations of holders 106 and 108 and are not limiting on the illustrative embodiments. Holders of sizes, shapes, characteristics, and locations other than those depicted or described are contemplated within the scope of the illustrative embodiments. For example, a particular implementation of holder 104 may position the holder in the back of device 102 instead of on a side as shown in FIG. 1 without departing from the scope of the illustrative embodiments. As another example, an implementation may use a shape of holders 106 and 108 such that device 102 and wireless headset 104 are movable with respect to one another while remaining secured to one another.

Furthermore, a particular implementation may use any shape, size, position, and number of contacts 110 and 112. FIG. 1 depicts two rectangular contacts forming contacts 110 and 112 only as exemplary and is not limiting on the illustrative embodiments. For example, an implementation may use four contacts in each of contacts 110 and 112, or four contacts in contacts 110 and two in contacts 112, or vice versa, without departing from the scope of the illustrative embodiments. As another example, an implementation may use coaxial circular contacts instead of rectangular contacts such that wireless headset 104 may rotate about the center of the contacts with contacts 110 remaining electrically connected to the corresponding contacts 112 on wireless headset 104.

In a particular implementation, coaxial contacts may be used, for example, in combination with holder 106 being a circular cavity and holder 108 being a circular projection. Generally, contacts may be situated with respect to the holders such that the contacts in the device and the wireless headset make an electrical connection when the holders are fastened to each other. Many other combinations of shapes, sizes, positions, orientations, and other characteristics of the holders and the contacts may be conceived from this disclosure.

With reference to FIG. 2, this figure depicts a wireless headset and a corresponding device in a second configuration in accordance with an illustrative embodiment. Device 202 is device that may correspond to wireless headset 204 in the manner of device 102 and wireless headset 104 in FIG. 1. Device 202 may include holder 206, which may receive holder 208 of wireless headset 204 so as to securely hold wireless headset 204 in proximity of device 202. Device 202 may further include contacts 210, and wireless headset 204 may further include contacts 212, as described in FIG. 1.

FIG. 2 exemplarily depicts different number of contacts in each of contacts 210 and 212. Contacts 210 is shown to include four substantially rectangular contacts, whereas contacts 212 is shown to include two contacts that may be cylindrical or conical. Note that the two cylindrical or conical contacts of contacts 212 may make electrical connections with two or more of the four substantially rectangular contacts in contacts 210.

Furthermore, FIG. 2 shows device 202 as including more than one holders, each with a set of contacts. A particular implementation may include any number of holders and sets of contacts, and those holders and sets of contacts may differ in their configurations from one another.

With reference to FIG. 3, this figure depicts a wireless headset and a corresponding device in a third configuration in accordance with an illustrative embodiment. Device 302 is device that may correspond to wireless headset 304 in the manner of device 102 and wireless headset 104 in FIG. 1. Device 302 may include holder 306, which may receive holder 308 of wireless headset 304 so as to securely hold wireless headset 304 in proximity of device 302. Device 302 may further include contacts 310, and wireless headset 304 may further include contacts 312, as described in FIG. 1.

FIG. 3 exemplarily depicts concentric contacts in each of contacts 310 and 312. Contacts 310 and 312 are each shown to include two concentric contacts. In one embodiment, contacts 310 may be female concentric contacts and contacts 312 may be male concentric contacts. In another embodiment contacts 310 may be male and 312 female. In either case, contacts 312 may make electrical connections with contacts 310 when holder 308 is press-fitted into holder 306. In the configuration depicted in this figure, wireless headset 304 when fastened to device 302 may rotate about the common center of holders 306 and 308, and contacts 310 and 312 without disrupting electrical connectivity between contacts 310 and 312.

The illustrations of FIGS. 1-3 are exemplary and have been selected for the clarity of the description of the illustrative embodiments. Furthermore, while some of these figures depict one device with one holder and one wireless headset with one holder, an implementation may use the illustrative embodiments to create a device with more than one holder for more than one wireless headset. For example, a portable mp3 player may have two holders and may hold two wireless earpieces, which the user may use for stereo effect. As another example, a mobile phone may include two holders of same or different shapes to accommodate two wireless headsets, for example, one for the user's car and one for the user to carry.

Figure 4:
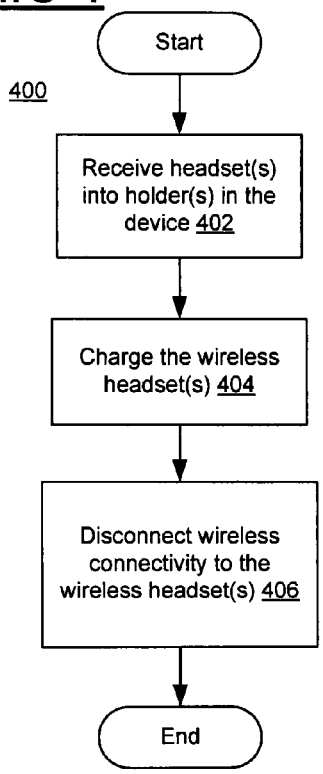
FIG. 4 depicts a flowchart of a process of charging a wireless headset in accordance with an illustrative embodiment.

With reference to FIG. 4, this figure depicts a flowchart of a process of charging a wireless headset in accordance with an illustrative embodiment. Process 400 may be implemented in device 102 in FIG. 1, or device 202 in FIG. 2, or device 302 in FIG. 3.

Figure 4A:
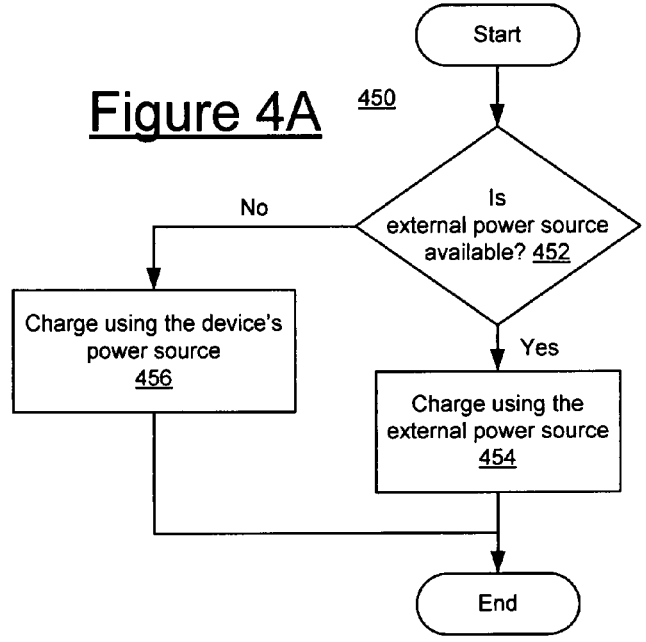
FIG. 4A depicts a flowchart of the process of selecting a power source for charging a wireless headset in accordance with an illustrative embodiment.

Process 400 begins by receiving one or more wireless headsets using one or more holders on a device (step 402). The process charges the one or more wireless headsets thus received (step 404). FIG. 4A shows more details of step 404.

In one embodiment, process 400 may disconnect the wireless connectivity to the wireless headset(s) received in step 402 (step 406). The process may do so for many reasons, including preserving battery life of the device by switching off Bluetooth radio transceiver in the device. The process ends thereafter. Another embodiment may omit step 406 and may continue to keep the wireless connectivity active, such as for keeping another wireless headset operational.

With reference to FIG. 4A, this figure depicts a flowchart of the process of selecting a power source for charging a wireless headset in accordance with an illustrative embodiment. Process 450 may be implemented as step 404 in process 400.

Process 450 begins by determining if a power source external to the device is available (step 452). If an external power source, such as a charger connected to the device, is available ("Yes" path of step 452), the process charges the one or more wireless headsets received in step 402 in FIG. 4 using the external power source (step 454). For example, the external power source may provide 12V DC but the wireless headset may require 4.5V DC for charging. The process may modify the electrical power from the external power source so that the modified electrical power is suitable for charging the wireless headset.

Furthermore, if two different wireless headsets are being charged using process 450, the wireless headsets may require different electrical power for charging. For example, one wireless headset may need 4.5V DC whereas the other may need 6V DC to charge. The process may perform different modifications of the electrical power from the external power source for each wireless headset such that each wireless headset is charged appropriately. Many other variations of charging characteristics, electrical power requirements, external power supply characteristics can similarly be used without departing from the scope of illustrative embodiments.

Returning to step 452, if the process determines that an external power source is not available ("No" path of step 452), the process may charge the one or more wireless headsets using the device's power source, such as the battery of a mobile phone. The process ends thereafter.

An implementation of process 450 may include an optional step (not shown) for deciding whether the device's power source is capable of charging the one or more wireless headsets. For example, if a mobile phone's battery is itself low on charge, such as below a threshold level of volt-amperes (VA), the process may decide not to charge the one or more wireless headsets. As an example, an implementation of process 450 may decide not to charge a wireless headset if a mobile phone's battery is providing electrical power below 30 mVA.

Alternatively, the process may decide to charge only one wireless headset and not more. Furthermore, the process may decide which of the several wireless headsets the process will charge under such circumstances. Many other variations of this option step and other additional steps may be added to process 450 within the scope of the illustrative embodiments.

Additionally, an implementation of process 450 may include a step to display a "charging" status using a display on the device, the wireless headset, or both. For example, such an implementation of process 450 may display to the user using the mobile phone's display that the wireless headset is charging. Such an implementation may also display to the user that the wireless headset is not charging when the battery of the phone is below a threshold VA. Many other charging statuses may be displayed, including graphical displays of the charging status.

With reference or FIG. 5, this figure depicts a flowchart of a process of connecting a telecommunication call in accordance with an illustrative embodiment. Process 500 may be implemented in device 102 in FIG. 1, which may be a mobile phone.

Process 500 begins by receiving a call (step 502). The process determines if the wireless headset has been removed from the holder (step 504). If the wireless headset has been removed from the holder of the device ("Yes" path of step 504), the process may connect the call via the wireless headset (step 506). If the process determines that the wireless headset has not been removed from the holder of the device ("No" path of step 504), the process may connect the call via the device (step 508). The process ends thereafter.

Process 500 has been described with respect to a one embodiment, in which the device implementing process 500 may be a mobile phone or another type of phone capable of making and receiving telephone calls. Removing the wireless headset from the holder of the phone may cause the phone to take an action, for example, connect a call via the wireless headset.

However, this embodiment has been used only as exemplary and is not limiting on the illustrative embodiments. For example, in another embodiment, the device may be a portable music device. Removing the wireless headset, which may be two wireless earpieces, from one or more holders may cause the device to take an action, such as start playing music via the wireless earpieces. In another embodiment, the device may be an instrument, such as a global positioning system (GPS) unit in an automobile. Removing the wireless headset from the holder of the device may cause the device to take an action, such as initiate the instrument, make the instrument ready for accepting commands or delivering information, or perform another function depending on the nature of the device. Any device that has the capability of using a wireless headset, wireless earpiece, or another type of compatible wireless device may implement process 500 to perform a function of the device in this manner.

Additionally, he various steps of processes 400, 450, and 500 have been chosen and described only as exemplary and are not limiting on the illustrative embodiments. An implementation of the illustrative embodiments may alter, combine, delete or augment these steps without departing from the scope of the illustrative embodiments.

Thus, the illustrative embodiments describe a method, apparatus and computer usable program product for presenting additional information about a telecommunication user. Using the illustrative embodiments, a party receiving a call from a caller can get additional information about the caller and be better prepared for the call as compared to when such additional information is not available. Using the illustrative embodiments, a party placing a call to a called party can also get additional information about the called party and become more aware about the specific circumstances of the called party as compared to without such additional information.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communication link. This communication link may use a medium that is, for example without limitation, physical or wireless.

The above description has been presented for purposes of illustration and description, and is not intended to be exhaustive or limited to the illustrative embodiments in the form disclosed. Many modifications and variations will be apparent to those of ordinary skill in the art.

What is claimed:

1. An electronic device integrated holder and charger, comprising:
    a first holder built into the electronic device and configured to hold an object coupled to the first holder, wherein the first holder is a first set of holders, each holder in the first set of holders being configured to hold an object, and wherein two holders in the first set of holders are configured differently from one another to hold different objects;
    a second holder built into a wireless headset and configured to couple to the first holder such that the wireless headset is held in proximity of the, electronic device by such coupling;
    a first set of contacts accessible from the first holder and configured to provide electrical power; and
    a second set of contacts accessible from the second holder and configured to receive electrical power from the first set of contacts when the second holder is coupled to the first holder.

2. The electronic device integrated holder and charger of claim 1, wherein the number of contacts in the first set of contacts is different from the number of contacts in the second set of contacts.

3. The electronic device integrated holder and charger of claim 1, wherein a shape of the second holder and a shape of the first holder facilitate the wireless headset to engage with the electronic device such that the first and second sets of contacts make an electrical connection.

4. The electronic device integrated holder and charger of claim 3, wherein the shape of the second holder is a projection and the shape of the first holder is a recess configured to receive the projection.

5. The electronic device integrated holder and charger of claim 1, wherein each holder in the first set of holders has a set of contacts configured to provide electrical power.

6. The electronic device integrated holder and charger of claim 5, wherein two holders in the first set of holders have sets of contacts configured to provide electrical power of characteristics different from each other.

7. The electronic device integrated holder and charger of claim 1, wherein the electronic device is configured to take an action when the second holder is one of coupled to and decoupled from the first holder.

8. The electronic device integrated holder and charger of claim 7, wherein the action when the second holder is decoupled from the first holder is connecting a call through the wireless headset.

9. The electronic device integrated holder and charger of claim 1, wherein the electronic device is configured to not supply electrical power to the first set of contacts if available power in a power source of the electric device is at or below a predetermined threshold level.

10. A method for holding and charging a plurality of wireless devices, comprising:
    fastening the plurality of wireless devices to a device, wherein the plurality of wireless devices includes a wireless headset;
    providing electrical power from the device to the plurality of wireless devices; and
    charging a power source in two or more wireless devices of the plurality of wireless devices using electrical power of different characteristics for the two or more wireless devices.

11. The method of claim 10, wherein the fastening includes fastening using a shape of a first holder on the device and a shape of a second holder on a wireless headset such that the shapes of the first and second holders facilitate the wireless headset to engage with the device such that the first and second sets of contacts make an electrical connection.

12. The method of claim 10, further comprising taking an action when the wireless headset is one of coupled to and decoupled from the device.

13. The method of claim 12, wherein taking the action includes connecting a call through the wireless headset.

14. The method of claim 10, further comprising preventing charging the power source in the wireless headset using the electrical power if the electrical power is below a present threshold level.

15. The method of claim 10, further comprising displaying an indication when charging.

* * * * *